United States Patent Office 3,513,178
Patented May 19, 1970

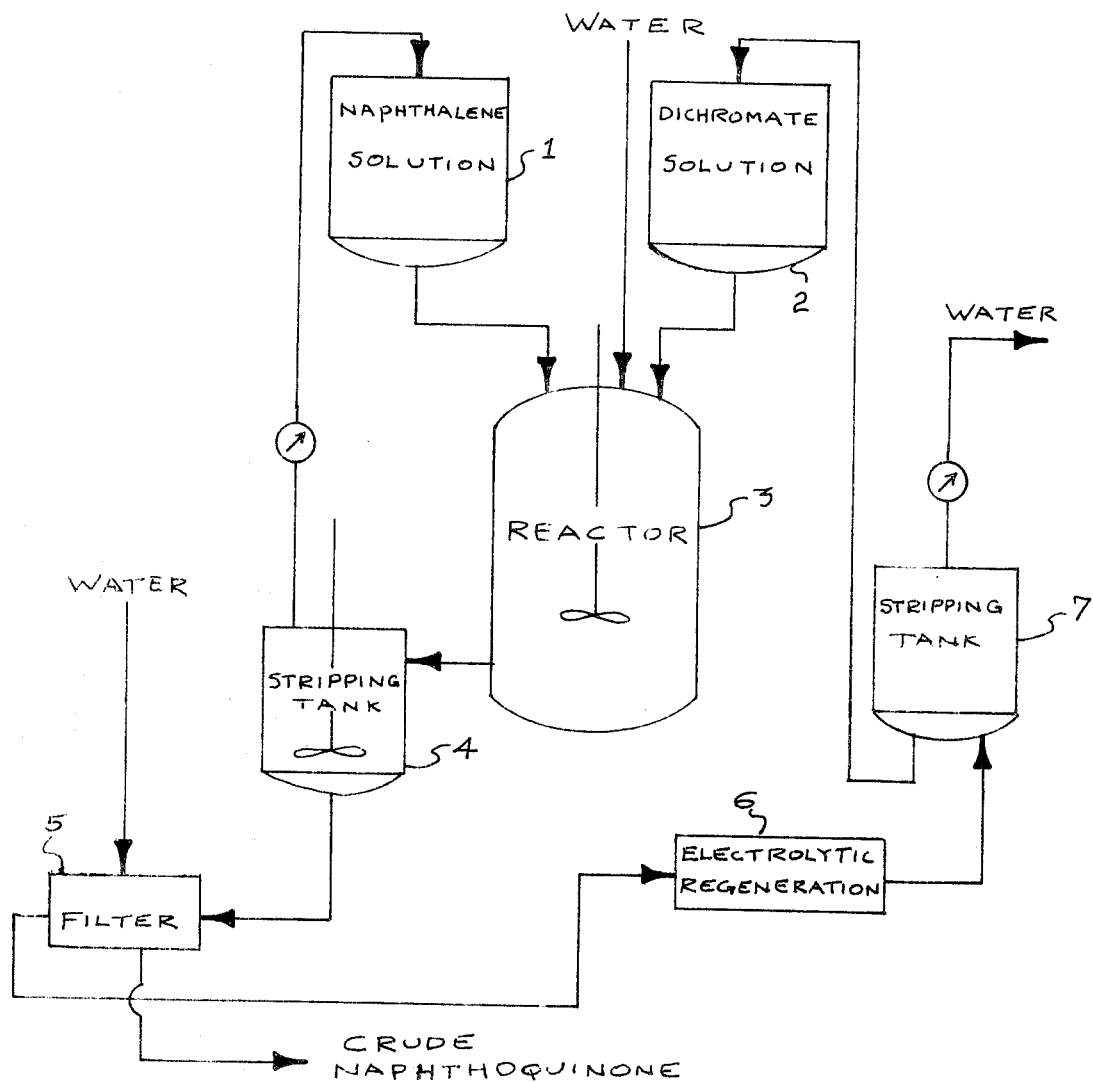

3,513,178
PRODUCTION OF ALPHA-NAPHTHOQUINONES
Louis A. Joo, Johnson City, and Loren A. Bryan, Elizabethton, Tenn., assignors to Great Lakes Carbon Corporation, New York, N.Y., a corporation of Delaware
Filed Jan. 19, 1967, Ser. No. 610,276
Int. Cl. C07c 49/66
U.S. Cl. 260—396                                    5 Claims

ABSTRACT OF THE DISCLOSURE

This invention relates to a new process for the preparation of α-naphthoquinones from naphthalene and β-substituted naphthalenes. More particularly, it relates to a process according to which a naphthalene is oxidized to an α-naphthoquinone by means of an electrolytically regenerated hexavalent chromium compound previously reduced in the course of an identical oxidation process.

Naphthalene and β-substituted naphthalenes, fully or partially dissolved in an inert, water immiscible organic solvent having a boiling point not greater than about 100° C., are oxidized by an aqueous sulfuric acid solution of partly (30 to 80%) electrolytically regenerated hexavalent chromium compounds to yield up to 40% α-naphthoquinone and larger proportions of β-substituted naphthoquinones. The reaction takes place at 5 to 50° C. for 2 to 8 hours in the presence of excess hexavalent chromium and sulfuric acid and with a water content of 40 to 70% by weight in the aqueous phase.

THE PRIOR ART

The production of α-naphthoquinone has so far proved relatively complicated and expensive, no matter which method is selected from those outstanding in the art. In one process, for instance, naphthoquinone is obtained by the condensation of benzoquinone with butadiene and subsequent dehydrogenation. While this process is still in current use, its inconvenience in multiplicity of steps, amount of equipment and time required can be easily imagined when it is considered that the synthesis of benzoquinone must first be carried out before the synthesis of naphthoquinone is attempted. Several simpler processes have been devised to avoid the undesirable aspects of the condensation method. These generally involve direct oxidation of naphthalene in vapor or liquid phase. However, vapor phase oxidation over a stabilized vanadium oxide catalyst is attended by severe difficulties in obtaining good quinone from the oxidate mixtures, contaminated as they are with, among other things, 10% to 40% unconverted naphthalene as well as with phthalic acid. For this reason, liquid phase oxidation of naphthalene by hexavalent chromium compounds has been generally favored even if it tends to yield predominant proportions of phthalic acid, a more highly oxidized product of naphthalene. Thus by adding an acetic acid solution of naphthalene to an aqueous acetic acid solution of chromium trioxide, there has been obtained yields of naphthoquinone varying from 20% to 38%, based on starting naphthalene. A more interesting approach which improves upon earlier chromic acid oxidations, is described by Hyman and Peters in U.S. Pat. No. 2,402,226. It consists essentially in carrying out the oxidation of naphthalenes by chromic acid in the presence of a diluent such as benzene or carbon tetrachloride. This and further refinement such as forming the chromic acid in situ as needed, by the gradual addition of sulfuric acid during the course of the reaction, permits the obtention of a range of naphthoquinone yields from about 40% in the case of naphthalene to almost 100% with certain β-substituted naphthalenes.

Although the oxidation of naphthalene with hexavalent chromium ion to naphthoquinone, phthalic acid and carbon dioxide consumes large quantities of oxygen as demonstrated by the following equations:

(I) 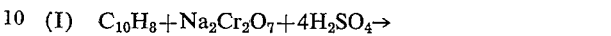
$$C_{10}H_8 + Na_2Cr_2O_7 + 4H_2SO_4 \rightarrow C_{10}H_6O_2 + Cr_2(SO_4)_3 + Na_2SO_4 + H_2O$$

(II) 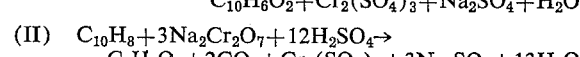
$$C_{10}H_8 + 3Na_2Cr_2O_7 + 12H_2SO_4 \rightarrow C_8H_4O_6 + 2CO_2 + Cr_2(SO_4)_3 + 3Na_2SO_4 + 13H_2O$$

the high solubility in aqueous medium of both sodium dichromate and the chromic acid that it forms in the presence of sulfuric acid, makes it possible to obtain concentrated, strongly oxidizing solutions. The problem faced by the art here has been to maintain, in the presence of such a strong oxidant, conditions which favor the partial oxidation of naphthalene to naphthoquinone, according to Equation I, and which repress the formation of phthalic acid illustrated by Equation II. As just noted, the process disclosed in U.S. 2,402,226 has been so far the most successful of the published methods in accomplishing this delicate control of the reaction. That process however is limited to the use of fresh sodium dichromate. It would certainly be desirable to use for the oxidation hexavalent chromium salts that have been partly regenerated by the electrolytic process described in copending application Ser. No. 493,995, filed on Oct. 8, 1965. But then, the idea of introducing into such an empirical system several changes in concentration and ratio, obviously opens the way to many unpredictable possibilities.

One of the difficulties envisaged in an attempt to devise an overall cyclic process in which the chromium salt oxidant is alternately reduced during oxidation of a naphthalene and regenerated electrolytically, resides in that if stoichiometric amounts of $Cr^{+6}$ ions and sulfuric acid are used as taught by Hyman and Peters, the conductivity of the spent chromium salt solution does not permit electrolytic regeneration. The cycle cannot be completed. Addition of sulfuric acid and water to permit regeneration, if carried out before the oxidation, interferes with the removal of the organic solvent and, more seriously, tends to produce lower yields of the naphthoquinone through facilitation of polymerization of this compound. On the other hand, to add the sulfuric acid after removal of the naphthoquinone and before the regeneration obviates any gain made elsewhere in the process since sulfuric acid cannot be removed easily after it has served its purpose. Another complication tending to lower the yield of a liquid phase naphthalene oxidation by regenerated chromium compounds is that the impossibility of adding the sulfuric acid gradually, due to the fact that it must be already present in the regeneration step, withdraws from any cyclic process the gains that Hyman and Peters have claimed for the in situ generation of chromic acid. These then are some of the problems faced in this endeavor. There are others; they shall be discussed in the course of the description of the invention.

OBJECTS OF THE INVENTION

Accordingly, it is an object of this invention to provide a process for the economical production of naphthoquinones through the oxidation of naphthalenes by electrolytically regenerated hexavalent chromium salts. Another object is to provide a cyclic process in which the chromium salts are constantly re-used. A further object is to provide a naphthalene oxidation process that does not require complete regeneration of the chromium salts in order to achieve the naphthoquinone yields obtainable by the best procedures outstanding in the field.

SUMMARY OF THE INVENTION AND DESCRIPTION OF DRAWING

These and other objects which shall become evident upon acquaintance with the present discovery, have been accomplished by a process which may be readily understood by reference to the flow sheet diagram provided with this specification, said diagram representing one embodiment of the invention. It will be noted here that only such equipment as is necessary for easy visualization of the process has been included in the diagram.

A suspension of naphthalene in a solvent such as carbon tetrachloride is prepared in make-up tank 1. Tank 2 contains an aqueous concentrate of hexavalent chromium, trivalent chromium, sulfuric acid and sodium sulfate obtained from the partial electrolytic regeneration of trivalent chromium in the spent liquors from a previous oxidation performed with either fresh sodium dichromate, sulfuric acid and water or with a regenerated hexavalent chromium solution.

The suspension of naphthalene and a stoichiometric excess of the solution containing the regenerated hexavalent chromium are transferred to reactor 3. The reactor is equipped with a high speed stirrer, heating and cooling facilities and a condenser. While vigorously stirring, sufficient heat is applied or removed to maintain the reactants at a temperature of about 5 to 50° C. for a period of about 3 to 5 hours. After this, the reaction mixture is pumped into stripping tank 4 where it is heated under reduced pressure with continuous stirring to remove the naphthalene solvent which is returned to tank 1. The pot residue is passed through filter 5 where the crude naphthoquinone is removed from the process after having been washed free of chromium salts with a quantity of water that is subsequently combined to the filtrate. The spent liquor is pumped to cell 6 for electrolytic regeneration. The regenerated solution is passed into stripping unit 7 where some water is distilled off. Finally, the concentrate is returned to tank 2, thus completing the cycle. The purification of the naphthoquinone is carried out according to known methods or modifications thereof.

DETAILED DESCRIPTION

Examples will now be provided to describe the invention in greater operational detail and to illustrate the effect of varying the most important parameters of the process. It must be understood that these examples are not to be construed as limits of the invention beyond those set by the appended claims.

EXAMPLE 1

An oxidizing solution was prepared by electrolytic regeneration of a spent chromium salt solution. The regeneration was carried out to the extent that 50% of the chromium ions present were converted to the hexavalent state. Water was distilled off so that only 55% of the total water present during regeneration remained. The final oxidant, ready for use on the naphthalene, had the following composition:

| | Parts by weight |
|---|---|
| $Cr^{+6}$ calculated as $Na_2Cr_2O_7$ (=76.7 parts $Cr^{+6}$) | 186.1 |
| $H_2SO_4$ | 389.8 |
| $Na_2SO_4$ | 104.2 |
| $Cr_2(SO_4)_3$ (=76.7 parts $Cr^{+3}$) | 288.4 |
| $H_2O$ | 984.5 |
| Total | 1953.0 |

This solution was added gradually over a period of 4 hours to the reactor in which there was previously placed a solution of naphthalene, 60 parts, in carbon tetrachloride, 168 parts. The reaction mixture was kept for one hour in the reactor after completion of the addition. Vigorous agitation and a temperature of approximately 16° C. were maintained during all this time. The reaction mixture was then transferred to the naphthalene solvent stripping tank where the carbon tetrachloride was removed by distillation under reduced pressure and returned to the naphthalene solution make-up tank. The aqueous residue was filtered and the cake washed free of green chromium salts and sulfuric acid with minimum water. The filter cake was dried in a forced draft oven at 80° C. After separation by a known method, there was recovered some unconverted naphthalene, 18.64 parts or 31.06% of the charge, some phthalic acid, 6.24 parts, and naphthoquinone, 29.82 parts. The naphthalene conversion thus amounted to 68.9% with a naphthoquinone to phthalic acid ratio of 4.78:1 and a naphthoquinone yield of 40.3%, based on the naphthalene charged. Most of the hexavalent chromium was consumed, 185.1 parts $Na_2Cr_2O_7$ or 99.46%, at a weight ratio to naphthoquinone of 6.2:1.

The cake wash water was combined with the filtrate and enough additional water was mixed in to facilitate the regeneration of trivalent chromium ions to hexavalent chromium ions. In the present case, a total of 805 parts by weight of water (or 45% of the total water needed) was added, including the cake wash water. No sulfuric acid need be added in routine regeneration of previously regenerated materials, but it should be pointed out here that when a spent oxidizing solution originally made with fresh 100% sodium dichromate according to the stoichiometric proportions set by Equation I, is to be regenerated for the first time after use in the Hyman and Peters process, sulfuric acid must be added at a level of about 13 parts per 100 parts of spent solution, water excluded.

Other naphthalene oxidations were carried out in a manner substantially in accord with the procedure of Example I except that changes were made in hexavalent chromium and sulfuric acid concentration. These changes are noted in Table I, which also includes, for comparison purposes, the make-up and results of the Example I preparation.

TABLE I.—EFFECT OF VARIATIONS OF CONCENTRATION OF HEXAVALENT CHROMIUM AND SULFURIC ACID [1]

| Ex. | $Na_2Cr_2O_7$ | | $H_2SO_4$ | | Products recovered, percent | | | Efficiency | |
|---|---|---|---|---|---|---|---|---|---|
| | Parts by weight | Molar excess,[2] | Parts by weight | Molar excess,[2] | $C_{10}H_8$ [3] | PA [4] | NQ [4] | NQ/PA | $Cr^{+6}$/NQ |
| 1 | 186 | 51 | 390 | 112 | 31.0 | 8.0 | 40.3 | 4.8 | 6.2 |
| 2 | 220 | 79 | 460 | 152 | 30.6 | 8.8 | 38.2 | 4.1 | 7.4 |
| 3 | 210 | 71 | 440 | 140 | 22.5 | 6.4 | 35.8 | 5.4 | 7.8 |

[1] All other variables were as per Example 1.
[2] Calculated according to Equation I.
[3] Portion of naphthalene charge unoxidized.
[4] Yields based on naphthalene charge according to Equations I and II. PA=phthalic acid; NQ=naphththo-quinone.

Upon examination of these results, it is apparent that concentrations of the oxidation reagents can be varied to some extent from the optimum values and yet give rise to acceptable yields of naphthoquinone at reasonable efficiency. With respect to the concentration of hexavalent chromium, for instance, it has been found that such excess should preferably be within about 50 to 160% over the stoichiometric proportions called for by Equation I. Such an excess, under the other conditions set forth within this specification, produces fairly constant yields of naphthoquinone while allowing for what is lost in the production of phthalic acid. Greater or lesser concentrations are not ruled out however if proper mixing is provided or if difficulties in recovery are ignored. These are matters of cost and convenience. As to the sulfuric acid concentration, an excess of up to 300%, based on the naphthalene charge is permissible. The use of excess sulfuric acid is unavoidable when regenerated hexavalent chromium salts are used for the oxidation. On the other hand, however, too much sulfuric acid complicates processing by increasing viscosity and by causing polymerization of the desired product. Preferred concentrations therefore range from about 50 to 200% more than stoichiometric requirements.

The hexavalent chromium content of the regenerated oxidant that has been found most practical from the point of view of reaction concentrations and volumes as well as on the basis of cost, has been that used in the examples given so far, i.e. about 50%. With respect to conversion of naphthalene and yield of naphthoquinone, however, any hexavalent chromium content between about 30 and about 80% will serve if one is prepared, on the one hand, to employ larger equipment or, on the other hand, to use more electricity with less efficiency.

Example 4

Another run was made substantially as in Example 1, except that the reaction mixture was more concentrated and the reaction was carried out at a higher temperature for a shorter overall time. Specifically, a 1.9:1 weight ratio of carbon tetrachloride to naphthalene was used and the oxidizing solution addition was carried out in 3 hours and 25 minutes. No extra reaction time was allowed. The reaction temperature was 26.5° C.

Under these altered conditions, a naphthoquinone yield of 35.7% and a phthalic acid yield of 8.27% were obtained, based on the naphthalene charged. The phthalic acid to naphthoquinone ratio was 4.1 and the weight consumption of $Na_2Cr_2O_7$ per weight of naphthoquinone was 6.94. Recovered naphthalene amounted to 32.4% of the charge. These results compare favorably with those of previous examples, although more phthalic acid has been produced than in Example 1 and, as expected according to Equation II, less efficient use of the $Cr^{+6}$ has been achieved.

Example 5

The procedure of Example 1 with minor changes was used to oxidize 50 g. of 2-methylnaphthalene. The carbon tetrachloride to methylnaphthalene weight ratio selected was 2.8:1 and a 50% excess of regenerated chromic acid was employed. The oxidation reaction ran for 6 hours at a mean temperature of 16° C. The yield of 2-methyl-1,4-naphthoquinone was 62%. No attempt was made to maximize this yield by studying the variables of this particular reaction.

Given however the established behavior of β-substituted naphthalenes in chromic acid oxidations, it is fairly demonstrated by this example that other β-substituted naphthalenes such as the 2,3- 2,5-, 2,7- and 2,8-dimethyl homologs may also be treated to advantage by the process of the present invention.

The concentration of water in the oxidizing solution is critical. In this respect, it has been observed that if no water be removed from the regenerated chromium salts-sulfuric acid solution before use in the naphthalene oxidation process, the yield of naphthoquinone decreases to as much as one half of what it should be with all other variables constant. This is probably due to changes in polarity, solubility and viscosity, which tend to favor production of phthalic acid and possibly polymerization of naphthoquinone. Too little water in the reaction mixture is not much better. As the reaction proceeds, the chromium sulphate formed upon the reduction of the sodium dichromate hydrates thus lowering further the concentration of water. The viscosity of the mixture increases rendering the stirring less efficient in mixing the two phases in the reactor. Poor mixing, in turn, favors polymerization and oxidation to phthalic acid due to localized over-concentrations of chromic acid. How much water is actually required in the reaction mixture is a function of the concentration of various other components of that mixture such as, as noted, chromium sulfate, amount of organic phase, carbon tetrachloride concentration. Water requirements are also affected by reaction temperature inasmuch as this affects solubilities and viscosities. An idea of the proper concentration may be obtained by considering that under the most favored conditions employed in Example 1, the water content of the aqueous phase is approximately 50% by weight while it rises to about 55% in Example 4.

In any event, the water content of the aqueous phase of the oxidation reaction mixture should be limited to 40 to 70% of the weight of that phase, although a weight content of 50+5% is preferred, as just implied.

The choice of organic liquid in which to fully or partially dissolve the naphthalene charge is seriously restricted by the severe requirements of the reaction. Such liquid that is selected must first be a solvent for naphthalene and, to some extent, for naphthoquinone. It must be immiscible with the aqueous phase of the reaction. It must be fairly resistant to oxidation by chromic acid. And finally, it should have a boiling point that is preferably not higher than about 100° C. for ease of processing and recovery. Among the few organic liquids that meet most of these stringent requirements are the lower boiling chlorinated hydrocarbons and benzene. Carbon tetrachloride is preferred.

The oxidation temperature must be kept between 5 and 50° C. for satisfactory yields of naphthoquinone. Below 5° C., there arises solubility and viscosity problems to an extent such that improved stirring will be of no avail. Over-oxidation takes place due to too high localized $CrO_3$ concentrations. Above 50° C., for instance at the temperature recommended for oxidations with fresh 100% $Cr^{+6}$ solutions (i.e. at 50 to 70° C.), consistently low yields of naphthoquinone have been obtained by oxidation with regenerated chromium solution. Naphthoquinone yields are maximized at temperatures within the range of 10 to 30° C.

The last factor of importance in converting naphthalenes to α-naphthoquinones by means of regenerated chromium salts is the oxidation time. This depends to some extent on equipment design inasmuch as temperature control facilities are involved. Rate of oxidant addition, concentration, mixing are also involved. Again, as in the case of water content, guidelines may be established from empirical data at about 2 to 8 hours.

It is apparent upon consideration of all the factors discussed that certain variations can be carried out in the exercise of this invention by persons skilled in the art without departing from its spirit and essence as summarized by the following claims.

We claim:
1. A process for converting a condensed ring aromatic hydrocarbon selected from the class consisting of naphthalene and lower alkyl beta-substituted naphthalenes to the corresponding alpha-naphthoquinone, which consists in subjecting the naphthalene in an inert, water-immiscible solvent carrier to the oxidizing action of an aqueous sulfuric acid solution of a chromium compound that has been electrolytically regenerated to contain from about

30 to about 80% of its chromium in the hexavalent state, said sulfuric acid solution containing from 40 to 70% water and from 50 to 200% sulfuric acid in excess of the stoichiometric amount required, based on the naphthalene charge.

2. The process of claim 1 wherein the oxidation is carried out at a temperature of 5 to 50° C. for a period of 2 to 8 hours.

3. The process of claim 1 wherein the hydrocarbon to be oxidized is 2-methylnaphthalene.

4. The process of claim 1 wherein the oxidation is allowed to proceed at a temperature within the range of 10 to 30° C. for a period of 3 to 5 hours.

5. The process of claim 4 wherein about 50% of the chromium in the salts used is in the hexavalent state.

References Cited
UNITED STATES PATENTS 2,402,226  6/1946  Hyman et al. _____ 260—396

LORRAINE A. WEINBERGER, Examiner

L. A. THAXTON, Assistant Examiner